Patented Aug. 19, 1924.

1,505,820

UNITED STATES PATENT OFFICE.

BRICE P. THOMAS AND RICHARD E. RUTLEDGE, OF HOPE, ARKANSAS.

COMPOSITION OF MATTER.

No Drawing. Application filed January 31, 1920. Serial No. 355,422.

*To all whom it may concern:*

Be it known that we, BRICE P. THOMAS and RICHARD E. RUTLEDGE, citizens of the United States, residing at Hope, in the county of Hempstead and State of Arkansas, have invented new and useful Improvements in Composition of Matter, of which the following is a specification.

The object of our present joint invention is the provision of a highly efficient cement particularly adapted for repairing kinetoscope films and connecting sections of said films, and this without interfering with the use of the films in the ordinary manner and for the usual purpose.

To the attainment of the foregoing the invention consists in the improvement as hereinafter described and definitely claimed.

Our composition consists of the following ingredients combined in approximately the proportions stated, viz:

| | |
|---|---|
| Celluloid | 65 grains. |
| Acetic acid | 3 ounces. |
| Ether | 3 ounces. |
| Collodion | 2 ounces. |

In the preparation of the composition, the celluloid is dissolved in the acid and ether, and after the dissolution of the celluloid the collodion is added to the mixture.

In the event of the cement becoming thick due to exposure to the air, it may be readily thinned by the addition of ether as dictated by the judgment of the user.

Manifestly in lieu of the celluloid alluded to, old film or other material formed in whole or part of celluloid may be employed.

Experience has demonstrated that our novel cement, while inexpensive and susceptible of easy preparation, is highly efficient for the purposes stated, and when a film is repaired through the medium of the cement, or sections of film are joined by the same, the film will be capable of all of the uses to which kinetoscope films are ordinarily subjected.

Experience has also demonstrated that the ether in the cement renders the union of films or film sections stronger and adapts the cement to dry quickly, thereby making the cementing operation a quick one.

While we prefer the proportions stated, because of the results obtained, we do not desire to be understood as confining ourselves to the specific proportions, inasmuch as the same may be slightly varied without impairing the capacity of the cement.

Having described our invention, what we claim and desire to secure by Letters-Patent, is:

A film cement comprising a minor portion of celluloid and a major portion composed of commingled acetic acid, ether and collodion.

In testimony whereof we affix our signatures.

BRICE P. THOMAS.
RICHARD E. RUTLEDGE.